US012397789B2

United States Patent
Hayakawa

(10) Patent No.: US 12,397,789 B2
(45) Date of Patent: Aug. 26, 2025

(54) DRIVING CONTROL METHOD AND DRIVING CONTROL DEVICE

(71) Applicant: Nissan Motor Co., Ltd., Yokohama (JP)

(72) Inventor: Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/693,031

(22) PCT Filed: Sep. 21, 2021

(86) PCT No.: PCT/JP2021/034530
§ 371 (c)(1),
(2) Date: Mar. 18, 2024

(87) PCT Pub. No.: WO2023/047452
PCT Pub. Date: Mar. 30, 2023

(65) Prior Publication Data
US 2024/0391461 A1    Nov. 28, 2024

(51) Int. Cl.
*B60W 30/16* (2020.01)
*B60W 60/00* (2020.01)

(52) U.S. Cl.
CPC ........... *B60W 30/16* (2013.01); *B60W 60/005* (2020.02); *B60W 2520/10* (2013.01); *B60W 2554/4041* (2020.02); *B60W 2554/406* (2020.02); *B60W 2554/802* (2020.02)

(58) Field of Classification Search
None
See application file for complete search history.

(56) References Cited

U.S. PATENT DOCUMENTS

| | | | |
|---|---|---|---|
| 8,352,110 B1* | 1/2013 | Szybalski | G01S 19/10 701/41 |
| 2017/0261983 A1 | 9/2017 | Abe et al. | |
| 2018/0196427 A1* | 7/2018 | Majumdar | G05D 1/0061 |
| 2018/0208211 A1* | 7/2018 | Chiba | G08G 1/166 |
| 2018/0239352 A1* | 8/2018 | Wang | B60W 50/14 |
| 2018/0319402 A1* | 11/2018 | Mills | B60W 10/04 |
| 2020/0174470 A1* | 6/2020 | Park | G05D 1/0061 |
| 2020/0317227 A1 | 10/2020 | Fukamachi | |
| 2020/0317228 A1* | 10/2020 | Otake | B60W 50/14 |
| 2021/0009117 A1* | 1/2021 | Emura | B60Q 5/006 |

(Continued)

FOREIGN PATENT DOCUMENTS

| | | |
|---|---|---|
| JP | 2017-165157 A | 9/2017 |
| JP | 2020-019455 A | 2/2020 |

(Continued)

*Primary Examiner* — David P. Merlino
(74) *Attorney, Agent, or Firm* — Young Basile Hanlon & MacFarlane, P.C.

(57) ABSTRACT

A processor of a driving control device that controls driving of a subject vehicle at a predetermined driving assistance level determines whether a transition request that requires transition of a driving assistance level from a first driving assistance level to a second driving assistance level higher than the first driving assistance level is input, and relaxes the transition condition for the transition of the driving assistance level from the first driving assistance level to the second driving assistance level when the transition request is input.

11 Claims, 5 Drawing Sheets

(56) References Cited

U.S. PATENT DOCUMENTS

| | | | | |
|---|---|---|---|---|
| 2022/0073107 A1* | 3/2022 | Kim | ................... | G05D 1/0061 |
| 2023/0324908 A1* | 10/2023 | Ichikawa | ............ | B60W 50/082 |
| | | | | 701/23 |
| 2024/0199087 A1* | 6/2024 | Kume | .................. | G08G 1/0133 |

FOREIGN PATENT DOCUMENTS

| | | |
|---|---|---|
| JP | 2020-152288 A | 9/2020 |
| JP | 2020-170402 A | 10/2020 |

* cited by examiner

DRIVING CONTROL METHOD AND DRIVING CONTROL DEVICE

TECHNICAL FIELD

The present invention relates to a driving control method and a driving control device.

BACKGROUND

A driving control method disclosed in JP 2020-170402 A is to set a criterion for permitting driving assistance control for each of a plurality of sections into which a target travel route of a subject vehicle is divided.

SUMMARY

However, by the driving control method disclosed in JP 2020-170402 A, even when an occupant of the subject vehicle desires to increase a driving assistance level, it possibly becomes hard to increase the driving assistance level depending on a section in which the subject vehicle is traveling compared with another section.

A problem to be solved by the present invention is to provide a driving control method and a driving control device for easily increasing a driving assistance level when a transition request to increase the driving assistance level is input.

The present invention solves the above-described problem by determining whether a transition request that requires transition of a driving assistance level from a first driving assistance level to a second driving assistance level higher than the first driving assistance level is input, and, when the transition request is input, relaxing a transition condition for the transition of the driving assistance level from the first driving assistance level to the second driving assistance level, compared with the case where the transition request is not input.

The present invention provides an effect that the driving assistance level is easily increased when the transition request to increase the driving assistance level is input because the transition condition is relaxed when the transition request is input.

DETAILED DESCRIPTION

Embodiments of the present invention will be described below with reference to the drawings.

Figure 1:
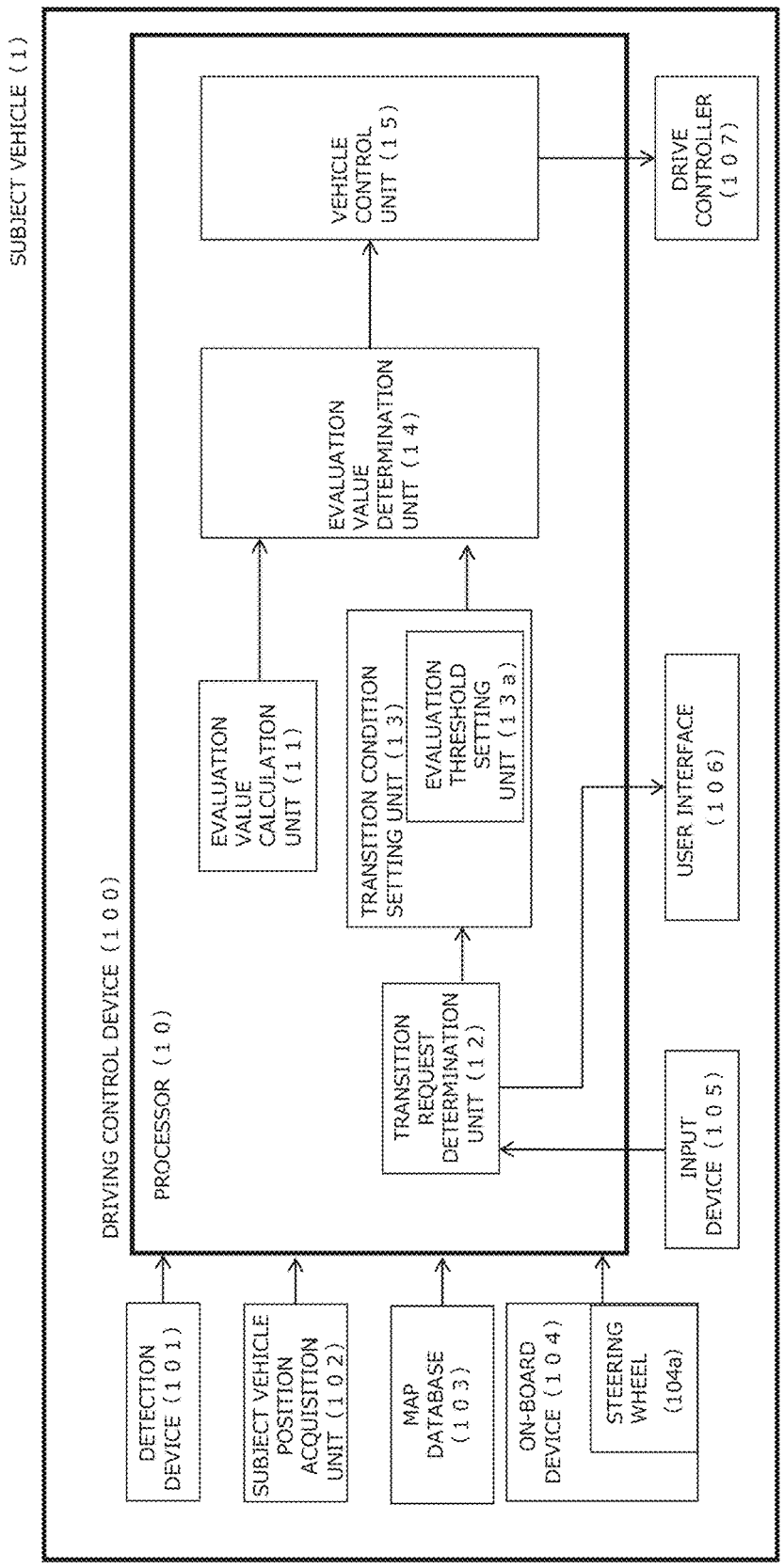
FIG. 1 is a block diagram illustrating a configuration of a driving control device according to an embodiment.

FIG. 1 is a block diagram illustrating a configuration of a subject vehicle 1 and a driving control device 100 that controls autonomous driving of the subject vehicle 1. The subject vehicle 1 includes the driving control device 100, a detection device 101, a subject vehicle position acquisition unit 102, a map database 103, on-board devices 104, an input device 105, a user interface 106 and a drive controller 107.

The driving control device 100 executes a program stored in a ROM by a CPU, thereby autonomously controlling the vehicle speed and steering of the subject vehicle 1 by an autonomous travel control function. The driving control device 100 can set a driving mode corresponding to a driving assistance level, and can assist the travel of the subject vehicle according to the set driving mode. The driving assistance level indicates the degree of intervention when the driving control device 100 assists the driving of a vehicle by means of the autonomous travel control function. The driver's contribution to the driving of the vehicle decreases as the driving assistance level increases. Specifically, the driving assistance level can be set to levels 0 to 5 using the definitions or the like based on SAE J3016 of the Society of Automotive Engineers (SAE). In the level 0, all of the driving operations of the subject vehicle are carried out manually by a driver. In the level 1, although the driving operations of the subject vehicle are primarily carried out by means of manual driving of the driver, the driving control device 100 appropriately assists the manual driving of the driver by means of any of functions such as automatic braking, following, and lane keeping. In the level 2, although the driving operations of the subject vehicle are primarily carried out by means of the manual driving of the driver, under specific conditions, the driving control device 100 can combine a plurality of functions from among an automatic brake function, a following function, a lane keeping function, and the like, thereby executing driving assistance. In the level 3, the driving control device 100 executes all of the driving tasks, but the driver must resume control and be prepared to drive manually when requested by the driving control device 100. In the level 4, the manual driving by the driver is not required, and the driving control device 100 can execute all of the driving tasks and monitor the surrounding conditions of the subject vehicle under specific conditions. In the level 5, the driving control device 100 can execute all of the driving tasks under all conditions.

The driving mode corresponding to the level 2 is an eyes-on mode. That is, when the driving assistance level is set to the level 2, the driver needs to visually monitor the surrounding conditions of the subject vehicle 1. When the driving assistance level is set to the level 2, the face direction and the eye movement of the driver are monitored by an in-vehicle camera or the like, and the subject vehicle 1 is allowed to travel when the driver visually confirms the front. Additionally, the driving mode corresponding to the level 2 is a hands-on mode. The hands-on mode is a mode in which autonomous steering control by a processor 10 does not operate when the driver is not holding a steering wheel 104a. Whether the driver is holding the steering wheel 104a is detected by a touch sensor (not illustrated) provided on the steering wheel 104a or a steering torque sensor (not illustrated) of EPS.

The "driver holding the steering wheel 104a" includes not only a state in which the driver is firmly gripping the steering wheel 104a, but also a state in which the driver is lightly touching the steering wheel 104a.

Figure 2:
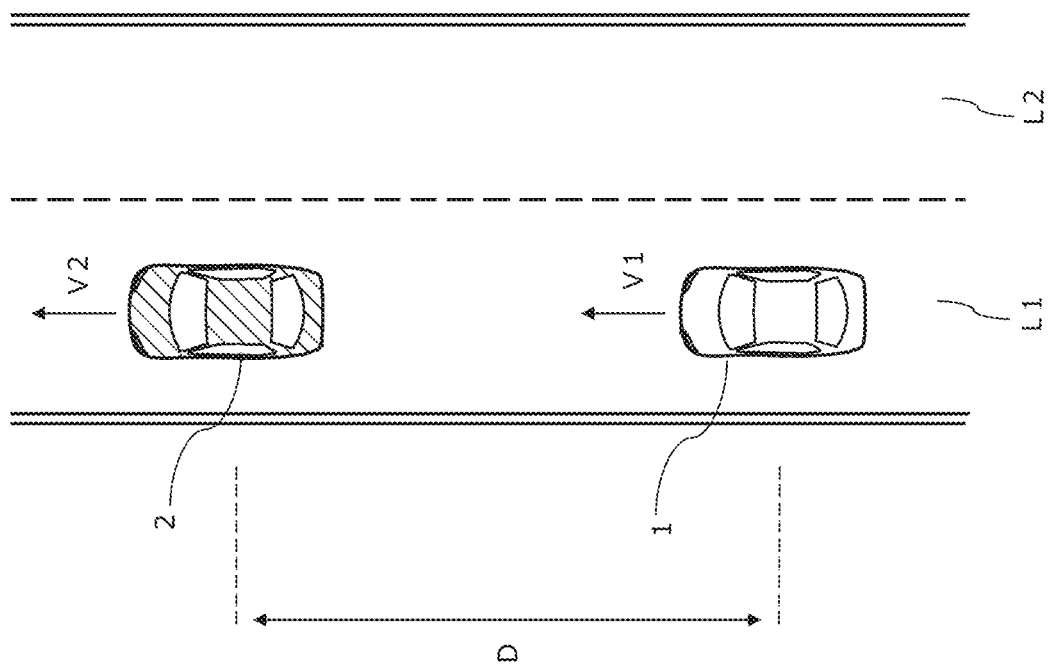
FIG. 2 is a diagram illustrating an example of a positional relation between a subject vehicle and a preceding vehicle.

On the other hand, the driving mode corresponding to the level 3 is an eyes-off mode. That is, when the driving assistance level is set to the level 3, the processor 10 controls the driving of the subject vehicle 1 by the eyes-off mode which permits the subject vehicle 1 to travel in a state where the driver does not visually confirm the front. At this time, the system of the driving control device 100 uses a camera, a radar, or the like to autonomously monitor the surrounding conditions of the subject vehicle. Additionally, the driving mode corresponding to the level 3 is a hands-off mode. The hands-off mode is a mode in which steering control by the processor 10 operates even if driver's hold on the steering wheel 104a is released. That is, when the driving assistance level is set to the level 3, the processor 10 controls the driving of the subject vehicle 1 by the hands-off mode which permits the subject vehicle 1 to travel in a state where driver's hold on the steering wheel of the subject vehicle 1 is released. The driving control device 100 can execute the driving mode corresponding to the level 3 under the condition that the subject vehicle 1 travels behind a preceding vehicle 2 as illustrated in FIG. 2.

Here, the "subject vehicle I traveling behind the preceding vehicle 2" includes not only a state in which the subject vehicle I travels by following the preceding vehicle 2, but also a state in which the subject vehicle 1 travels behind the preceding vehicle 2 on a travel route on which the preceding vehicle 2 has already traveled without following the preceding vehicle 2. This allows the driving control device 100 to confirm that there is no obstacle on the travel route on which the preceding vehicle 2 has already traveled, that is, in front of the subject vehicle 1 to control the driving of the subject vehicle 1. Additionally, the "subject vehicle 1 traveling by following the preceding vehicle 2" means that the subject vehicle 1 travels in a state where the driving control device 100 controls the driving of the subject vehicle 1 so as to be linked to the movement of the preceding vehicle 2, and controls a vehicle speed V1 of the subject vehicle 1 so as to keep a constant distance between the subject vehicle 1 and the preceding vehicle 2.

The classification of the driving assistance levels is not limited to the classification according to the definitions of the Society of Automotive Engineers, and the driving assistance levels may be defined based on ISO/TC204 of the International Organization for Standardization (ISO). Further, the classification of the driving assistance levels may be defined by other criteria as long as they are appropriately classified in accordance with the degree of intervention of the driving control device 100.

The detection device 101 includes any one or both of a vehicle-mounted camera that photographs surroundings of the subject vehicle 1 or a radar that detects other vehicles and obstacles around the subject vehicle. The detection result of the detection device 101 is output to the driving control device 100 at prescribed time intervals.

The subject vehicle position acquisition unit 102 includes a GPS unit, a gyro sensor, a vehicle speed sensor, and the like. The subject vehicle position acquisition unit 102 detects radio waves transmitted from a plurality of communication satellites by means of the GPS unit, periodically acquires position information about the subject vehicle 1, and detects the current location of the subject vehicle 1 based on the acquired position information about the subject vehicle 1, angle change information acquired from the gyro sensor, and the vehicle speed acquired from the vehicle speed sensor. The position information about the subject vehicle 1 detected by the subject vehicle position acquisition unit 102 is output to the driving control device 100 at prescribed time intervals.

The map database 103 is a memory configured to store high-precision three-dimensional map information that includes position information about various facilities and specific points, and to be accessible from the driving control device 100. The map database 103 stores high-precision digital map information (high-precision map, dynamic map). The high-precision map information includes identification information about a plurality of lanes on roads. The map information of the map database 103 includes three-dimensional position information about curved roads and/or lanes as well as the sizes of the curves (for example, the curvature or the radius of curvature), merging points, branch points, and lane reduction locations. The high-precision map information also includes information regarding facilities, such as service areas and parking areas.

The on-board devices 104 are various devices mounted in the vehicle and function by means of the driver's operation. The on-board devices 104 include a steering wheel 104a. Further, examples of the other on-board devices 104 include an accelerator pedal, a brake pedal, a navigation device, turn signal indicators, wipers, lights, a horn, and other specific switches. When the driver operates the on-board devices 104, the information is output to the driving control device 100.

The input device 105 is a device such as a button switch through which input by means of a driver's manual operation is possible, a touch panel arranged on a display screen, or a microphone through which input by means of a driver's voice is possible.

The user interface 106 outputs information by an image, a character, or a voice. The user interface 106 is, for example, a display or a microphone. One touch panel display may function as the input device 105 and the user interface 106.

The drive controller 107 controls the operation of the subject vehicle 1 based on a control command from the driving control device 100. For example, the drive controller 107 controls the operation of a drive mechanism (including the operation of an internal combustion engine in a vehicle with an engine and the operation of a travel motor in an electric vehicle system, and including torque distribution between an internal combustion engine and a travel motor in a hybrid vehicle) and the braking operation for adjusting the acceleration/deceleration and the vehicle speed by means of an autonomous speed control function. Further, the drive controller 107 controls the operation of a steering actuator by means of an autonomous steering control function, thereby executing steering control of the subject vehicle. For example, the drive controller 107 detects a lane marker of a lane in which the subject vehicle travels and controls the travel position (lateral position) of the subject vehicle in the road width direction so that the subject vehicle travels in the center of the lane. Further, the drive controller 107 controls overtaking of a vehicle traveling ahead of the subject vehicle, changes in the travel direction of the subject vehicle, and the like. Further, the drive controller 107 carries out travel control for turning right or left at an intersection or the like. Further, other known methods can be used as the driving control method carried out by the drive controller 107.

Next, the configuration of the driving control device 100 will be described in detail with reference to FIGS. 1 to 4.

In the following description, a first driving assistance level is set to the level 2, and a second driving assistance level is set to the level 3. In the relation between the first driving assistance level and the second driving assistance level, it is only necessary that the second driving assistance level is relatively higher than the first driving assistance level. Each of the driving assistance levels is not limited to the level 2 or the level 3. The processor 10 can set a driving mode corresponding to a driving assistance level other than the level 2 or the level 3.

As illustrated in FIG. 1, the driving control device 100 includes the processor 10. The processor 10 includes the Read Only Memory (ROM) that stores a program for controlling the driving of the subject vehicle 1, the Central Processing Unit (CPU) that executes the program stored in this ROM, and a Random Access Memory (RAM) that functions as an accessible storage device. As an operating circuit, a Micro Processing Unit (MPU), a Digital Signal Processor (DSP), an Application Specific Integrated Circuit (ASIC), a Field Programmable Gate Array (FPGA), and the like can be used in place of or in addition to the Central Processing Unit (CPU). The processor 10 includes an evaluation value calculation unit 11, a transition request determination unit 12, a transition condition setting unit 13, an evaluation value determination unit 14, and a vehicle control unit 15. The evaluation value calculation unit 11, the transition request determination unit 12, the transition condition setting unit 13, the evaluation value determination unit 14, and the vehicle control unit 15 execute programs for achieving the respective functions of the processor 10.

While the driving control device 100 is mounted in the subject vehicle 1 in FIG. 1, it is not limited thereto, and the driving control device 100 may be a device that remotely operates the subject vehicle 1.

The evaluation value calculation unit 11 calculates an evaluation value that indicates a sufficiency level of a transition condition for transition of the driving assistance level from the first driving assistance level to the second driving assistance level higher than the first driving assistance level. The transition condition is, for example, that the subject vehicle 1 is traveling at a predetermined set speed or less. In this example, the evaluation value calculation unit 11 calculates the evaluation value such that an evaluation value corresponding to a second vehicle speed lower than a first vehicle speed is higher than an evaluation value corresponding to the first vehicle speed. That is, the evaluation value calculation unit 11 sets the evaluation value by calculating the evaluation value to be higher as the vehicle speed of the subject vehicle 1 decreases.

The transition condition may be, for example, that the subject vehicle 1 is traveling behind the preceding vehicle 2. In this example, as illustrated in FIG. 2, the evaluation value calculation unit 11 calculates the evaluation value such that an evaluation value corresponding to a second inter-vehicular distance shorter than a first inter-vehicular distance is higher than an evaluation value corresponding to the first inter-vehicular distance based on an inter-vehicular distance D between the subject vehicle 1 and the preceding vehicle 2. That is, the evaluation value calculation unit 11 sets the evaluation value by calculating the evaluation value to be higher as the inter-vehicular distance D between the subject vehicle 1 and the preceding vehicle 2 becomes shorter. The evaluation value calculation unit 11 may calculate the evaluation value such that an evaluation value corresponding to a second elapsed time shorter than a first elapsed time is higher than an evaluation value corresponding to the first elapsed time based on an elapsed time after the detection of the preceding vehicle 2. That is, the evaluation value calculation unit 11 sets the evaluation value by calculating the evaluation value to be higher as the elapsed time after the detection of the preceding vehicle 2 becomes shorter because a possibility of an obstacle present on a route on which the preceding vehicle 2 has already traveled is low.

The transition condition may be, for example, that a traffic jam is present around the subject vehicle 1. In this example, the evaluation value calculation unit 11 calculates the evaluation value such that an evaluation value when a traffic jam is present is higher than an evaluation value when any traffic jam is not present. The evaluation value calculation unit 11 determines whether a traffic jam is present around the subject vehicle I based on a vehicle speed V2 of the preceding vehicle 2 and a vehicle speed of another vehicle (not illustrated) traveling in another lane L2 adjacent to a lane L1 in which the subject vehicle 1 travels.

The transition condition may be, for example, that a predetermined time has elapsed after the subject vehicle 1 passed through a branch road. In this example, the evaluation value calculation unit 11 may set the evaluation value by calculating the evaluation value to be higher as the predetermined time after the subject vehicle 1 passes through the branch road becomes longer.

The transition condition for increasing the driving assistance level may be, in addition to the above-described conditions, that the subject vehicle 1 is traveling on a road for which using high-precision map information is effective, that Global Navigation Satellite System (GNSS) signals are effective, that the driver visually confirms the front, that there are no toll booths, motorway exits, merging points, intersections, or lane reduction points in the vicinity of the current location (for example, within about 800 m ahead), that there are no sharp curves of 100 R or less in the vicinity of the current location (for example, within about 500 m ahcad), and the like. The evaluation value calculation unit 11 calculates the evaluation value indicating the sufficiency level of the condition for the transition of the driving assistance level from the first driving assistance level to the second driving assistance level based on one or a plurality of the conditions among the above-described conditions. For example, the evaluation value calculation unit 11 may calculate the sufficiency level for each of the plurality of conditions described above, and sum up the calculated sufficiency levels to calculate the evaluation value.

The transition request determination unit 12 illustrated in FIG. 1 determines whether a transition request that requires the transition of the driving assistance level from the first driving assistance level to the second driving assistance level is input to the input device 105. Specifically, the transition request determination unit 12 determines whether the traveling environment of the subject vehicle 1 has met a predetermined transition possible condition, and outputs a notification for inquiring whether to increase the driving assistance level to the user interface 106 when the traveling environment of the subject vehicle 1 meets the transition possible condition. An occupant of the subject vehicle I decides whether to approve the transition of the driving assistance level based on the notification output to the user interface 106, and inputs the transition request to the input device 105 when approving the transition of the driving assistance level. The transition request is input by operating a touch panel of the input device 105 or pressing a predetermined button switch by the occupant of the subject vehicle 1. The occupant of the subject vehicle I may input the transition request to a microphone of the input device 105 by a voice. The transition possible condition is a necessary condition for the driving assistance level of the subject vehicle 1 to become prepared for the transition from the first driving assistance level to the second driving assistance level. The transition possible condition is also a condition for notifying the occupant of the subject vehicle 1 that the driving assistance level can transition from the first driving assistance level to the second driving assistance level. The transition possible condition includes any one or a plurality of conditions among conditions, for example, that the vehicle speed of the subject vehicle 1 has decreased to a predetermined speed or less, that a preceding vehicle has been detected ahead of the subject vehicle 1, that the distance between the subject vehicle 1 and the preceding vehicle has decreased to a predetermined distance or less, and that a traffic jam is present within a predetermined distance ahead of the subject vehicle 1 on a planned travel route of the subject vehicle 1.

The transition condition setting unit 13 sets the transition condition for the transition of the driving assistance level from the first driving assistance level to the second driving assistance level. The transition condition is set to be stricter than the transition possible condition set by the transition request determination unit 12. The transition condition setting unit 13 includes an evaluation threshold setting unit 13a. The evaluation threshold setting unit 13a sets an evaluation threshold as a criterion for determining whether the driving assistance level transitions from the first driving assistance level to the second driving assistance level. That is, the evaluation threshold setting unit 13a sets a value corresponding to the transition condition for the transition of the driving assistance level from the first driving assistance level to the second driving assistance level as the evaluation threshold. When the transition request is input, the evaluation threshold setting unit 13a selects a second evaluation threshold lower than a first evaluation threshold in a case where the transition request is not input from among the preliminarily set first evaluation threshold and second evaluation threshold, and sets the second evaluation threshold as the evaluation threshold. That is, when the transition request is input, the evaluation threshold setting unit 13a relaxes the transition condition for the transition of the driving assistance level from the first driving assistance level to the second driving assistance level compared with the case where the transition request is not input.

Figure 3:
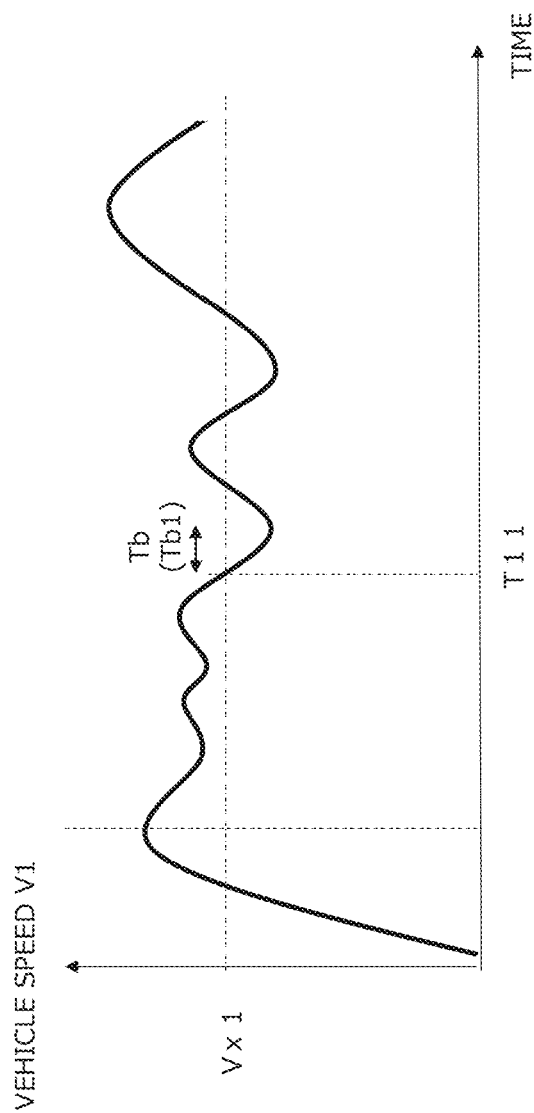
FIG. 3 is a diagram illustrating an example of a relation between a vehicle speed of the subject vehicle and a vehicle speed threshold for changing a driving assistance level.
Figure 4:
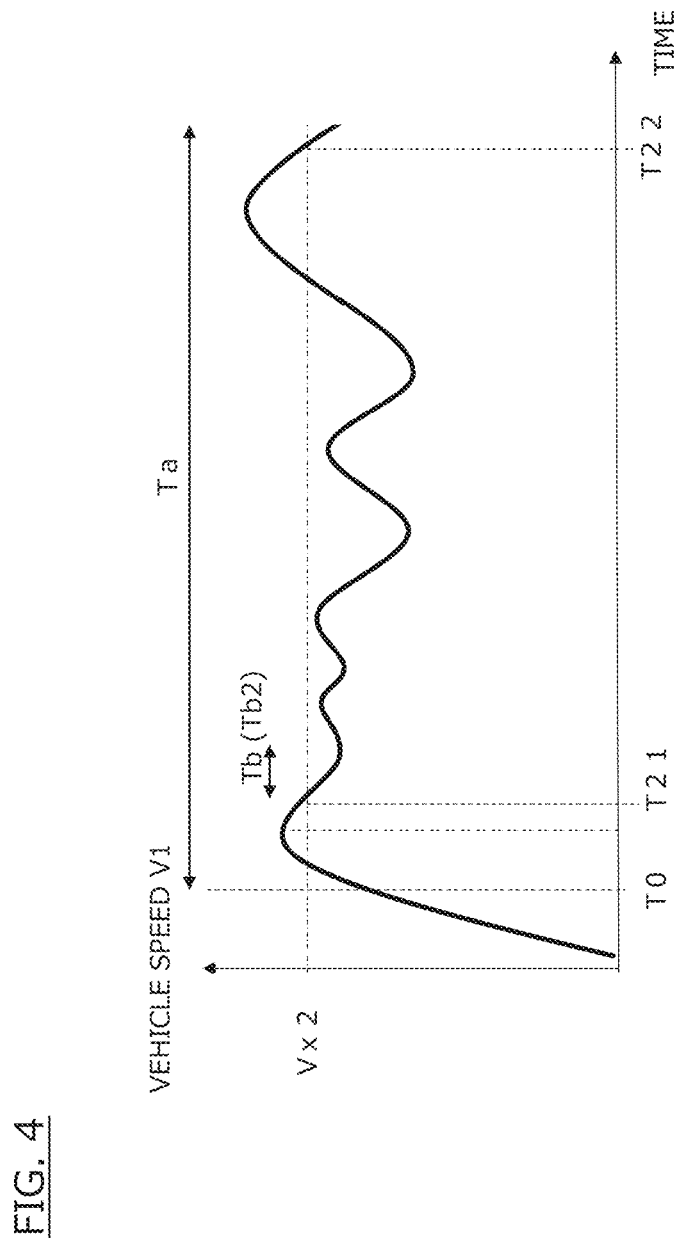
FIG. 4 is a diagram illustrating an example of the relation between the vehicle speed of the subject vehicle and the vehicle speed threshold for changing the driving assistance level, and is a diagram illustrating an example in which the vehicle speed threshold illustrated in FIG. 3 is changed to a higher value.

The evaluation value determination unit 14 compares the evaluation value calculated by the evaluation value calculation unit 11 with the evaluation threshold set by the evaluation threshold setting unit 13a to determine whether the evaluation value is higher than the evaluation threshold. Specifically, FIG. 3 and FIG. 4 illustrate comparisons between the vehicle speed V1 and set speeds Vx1, Vx2 in a case where the transition condition is that "the subject vehicle 1 is traveling behind the preceding vehicle 2" and that "the vehicle speed V1 of the subject vehicle 1 is equal to or less than predetermined set speeds Vx1, Vx2." In the examples illustrated in FIG. 3 and FIG. 4, the evaluation threshold setting unit 13a sets the set speed Vx2 (for example, 60 km/h) when the transition request is input to be higher than the set speed Vx1 (for example, 60 km/h) when the transition request is not input. That is, the evaluation value determination unit 14 determines that the evaluation value is higher than the evaluation threshold when the vehicle speed V1 of the subject vehicle 1 becomes the set speeds Vx1, Vx2 or less after timing T11 at which the preceding vehicle 2 is detected.

The evaluation value determination unit 14 may determine whether the inter-vehicular distance D between the subject vehicle 1 and the preceding vehicle 2 is equal to or less than a predetermined set inter-vehicular distance, and determine that the evaluation value is higher than the evaluation threshold when the inter-vehicular distance is equal to or less than the predetermined set inter-vehicular distance. The evaluation threshold setting unit 13a sets a set inter-vehicular distance when the transition request is input to be longer than a set inter-vehicular distance when the transition request is not input.

The evaluation value determination unit 14 may determine whether the elapsed time after the detection of the preceding vehicle 2 by the detection device 101 is longer than a predetermined set elapsed time, and determine that the evaluation value is higher than the evaluation threshold when the elapsed time is longer than the set elapsed time. The evaluation threshold setting unit 13a sets a set elapsed time when the transition request is input to be shorter than a set elapsed time when the transition request is not input.

When a traffic jam is present around the subject vehicle 1, and when the transition request is not input, the evaluation value determination unit 14 may determine that the evaluation value is higher than the evaluation threshold under the condition that the vehicle speed of the preceding vehicle 2 traveling in the same lane L1 as the subject vehicle 1 is equal to or less than a predetermined vehicle speed and the vehicle speed of the other vehicle traveling in the adjacent lane L2 is equal to or less than the predetermined vehicle speed. Meanwhile, when the transition request is input, the evaluation value determination unit 14 may determine that the evaluation value is higher than the evaluation threshold under the condition that the vehicle speed of the preceding vehicle 2 traveling in the lane L1 is equal to or less than the predetermined vehicle speed regardless of the vehicle speed of the other vehicle traveling in the adjacent lane.

The evaluation value determination unit 14 may determine whether a passing time after the subject vehicle 1 passes through the branch road is longer than a predetermined set passing time, and determine that the evaluation value is higher than the evaluation threshold when the passing time is longer than the set passing time. The evaluation threshold setting unit 13a sets a set passing time when the transition request is input to be shorter than a set passing time when the transition request is not input.

The processor 10 may set the transition condition corresponding to whether the transition request is input without setting the evaluation threshold. The processor 10 may determine whether the traveling environment of the subject vehicle 1 meets the transition condition without calculating the evaluation value.

Next, when the evaluation value determination unit 14 determines that the evaluation value is higher than the evaluation threshold, and when the subject vehicle 1 is controlled at the first driving assistance level, the vehicle control unit 15 illustrated in FIG. 1 controls the driving of the subject vehicle 1 such that the driving assistance level transitions from the first driving assistance level to the second driving assistance level.

Specifically, when the transition request is not input, as illustrated in FIG. 3, the vehicle control unit 15 causes the driving assistance level to transition from the first driving assistance level to the second driving assistance level at transition timing T11 at which the vehicle speed V1 becomes the set speed Vx1 or less. Meanwhile, when the transition request is input, as illustrated in FIG. 4, the vehicle control unit 15 causes the driving assistance level to transition from the first driving assistance level to the second driving assistance level at transition timing T21 at which the vehicle speed V2 becomes the set speed Vx2 or less. Here, the transition timing T21 when the transition request is input is earlier than the transition timing T11 when the transition request is not input. Additionally, as illustrated in FIG. 4, the vehicle control unit 15 maintains the set speed at the speed Vx2 until a predetermined time Ta elapses after the input of the transition request. That is, the vehicle control unit 15 maintains the evaluation threshold at the first evaluation threshold when the transition request is input until the predetermined time Ta elapses after the input of the transition request. Accordingly, when the transition request is input, the set speed is maintained at the speed Vx2 until the predetermined time Ta elapses even at second transition timing T22 at which the driving assistance level transitions to the second driving assistance level again after it decreases to the first driving assistance level.

The vehicle control unit 15 causes the driving assistance level to transition from the first driving assistance level to the second driving assistance level after the evaluation value becomes a value higher than the evaluation threshold and then a predetermined transition time Tb elapses. The vehicle control unit 15 sets a second transition time Tb2 (see FIG. 4) when the transition request is input to be shorter than a first transition time Tb1 (see FIG. 3) when the transition request is not input. That is, the vehicle control unit 15 causes the driving assistance level to transition early from the first driving assistance level to the second driving assistance level when the transition request is input.

Next, a procedure of a driving control method executed by the driving control device 100 will be described using the flowchart illustrated in FIG. 5.

Figure 5:
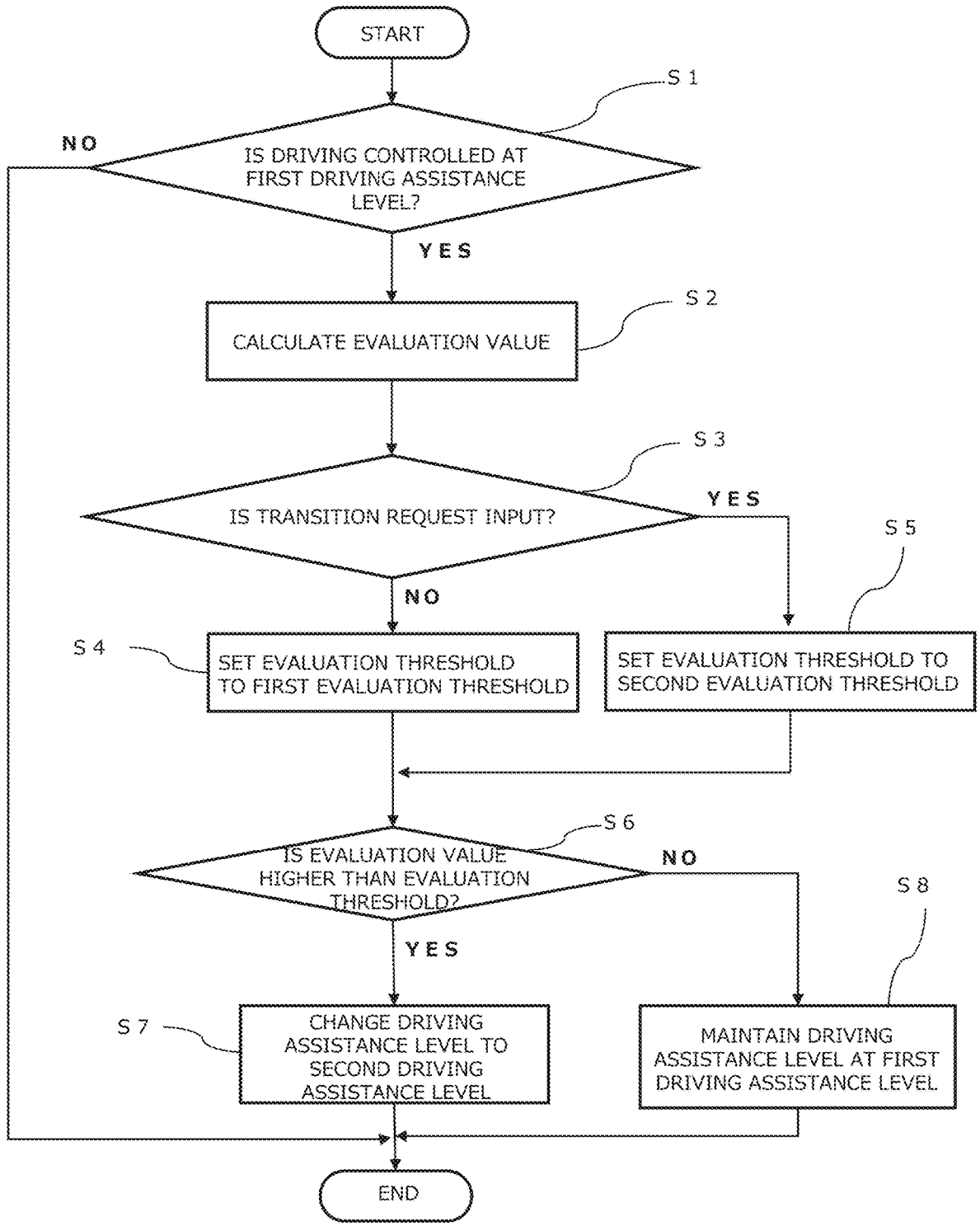
FIG. 5 is a flowchart illustrating a procedure of a driving control method executed by the driving control device illustrated in FIG. 1.

As illustrated in FIG. 5, in Step S1, the processor 10 determines whether the driving of the subject vehicle 1 is controlled at the first driving assistance level. When the driving assistance level is the second driving assistance level, the processor 10 ends the process.

When the driving assistance level is the first driving assistance level, in Step S2, the processor 10 calculates the evaluation value that indicates the sufficiency level of the transition condition for the transition of the driving assistance level from the first driving assistance level to the second driving assistance level.

Next, in Step S3, the processor 10 determines whether the transition request is input to the input device 105. When the transition request is not input, in Step S4, the processor 10 selects and sets the first evaluation threshold as the evaluation threshold. Meanwhile, When the transition request is input, in Step S5, the processor 10 selects and sets the second evaluation threshold lower than the first evaluation threshold as the evaluation threshold. That is, the processor 10 relaxes the transition condition when the transition request is input compared with the case where the transition request is not input.

Next, in Step S6, the processor 10 determines whether the evaluation value is higher than the evaluation threshold set in Step S4 or S5. When the evaluation value is higher than the evaluation threshold, in Step S7, the processor 10 increases the driving assistance level to change it from the first driving assistance level to the second driving assistance level. Meanwhile, when the evaluation value is equal to or less than the evaluation threshold, in Step S8, the processor 10 maintains the driving assistance level at the first driving assistance level.

As described above, the processor 10 of the driving control device 100 according to the embodiment determines whether the transition request that requires the transition of the driving assistance level from the first driving assistance level to the second driving assistance level is input. When the transition request is input, the processor 10 relaxes the transition condition for the transition of the driving assistance level from the first driving assistance level to the second driving assistance level. This allows the driving control device 100 to easily increase the driving assistance level when the transition request for increasing the driving assistance level of the subject vehicle 1 is input. Accordingly, in response to the request for increasing the driving assistance level from the first driving assistance level to the second driving assistance level from the occupant, the driving control device 100 can make the transition timing T21 at which the driving assistance level transitions from the first driving assistance level to the second driving assistance level earlier as illustrated in FIG. 4. Additionally, as illustrated in FIG. 4, since the transition condition for increasing the driving assistance level is relaxed when the transition request is input, the frequency of switching the driving assistance level is reduced compared with the case where the transition request is not input as illustrated in FIG. 3, and this allows the occupant of the subject vehicle 1 to easily grasp the timing at which the driving assistance level is switched.

The processor 10 of the driving control device 100 calculates the evaluation value that indicates the sufficiency level of the transition condition. When the transition request is input, the driving control device 100 selects the second evaluation threshold lower than the first evaluation threshold in the case where the transition request is not input as the evaluation threshold. Then, the driving control device 100 controls the driving of the subject vehicle 1 such that the driving assistance level transitions from the first driving assistance level to the second driving assistance level when the evaluation value is higher than the evaluation threshold, and when the subject vehicle 1 is controlled at the first driving assistance level. Accordingly, since the evaluation threshold is set such that the second evaluation threshold when the transition request is input is lower than the first evaluation threshold when the transition request is not input, the driving control device 100 can relax a transition condition when the transition request is input more than a transition condition when the transition request is not input. The driving control device 100 can determine whether to increase the driving assistance level based on the specific comparison between the evaluation value and the evaluation threshold.

The processor 10 of the driving control device 100 maintains the evaluation threshold at the second evaluation threshold until the predetermined time Ta elapses after the input of the transition request as illustrated in FIG. 4. This allows the driving control device 100 to cause the driving assistance level to transition from the first driving assistance level to the second driving assistance level again based on the second evaluation threshold during the predetermined time Ta after the input of the transition request even when the driving assistance level returns to the first driving assistance level from the second driving assistance level.

The processor 10 of the driving control device 100 sets the transition time Tb after the evaluation value becomes a value higher than the evaluation threshold until the driving assistance level transitions from the first driving assistance level to the second driving assistance level such that the second transition time Tb2 when the transition request is input is shorter than the first transition time Tb1 when the transition request is not input. This allows the driving control device 100 to reduce a time necessary for the transition of the driving assistance level in response to the request of increasing the driving assistance level from the first driving assistance level to the second driving assistance level from the occupant when the transition request is input.

The processor 10 of the driving control device 100 calculates the evaluation value such that the evaluation value corresponding to the second vehicle speed of the subject vehicle 1 lower than the first vehicle speed is higher than the evaluation value corresponding to the first vehicle speed of the subject vehicle 1. This allows the driving control device 100 to easily increase the driving assistance level from the first driving assistance level to the second driving assistance level as the vehicle speed V1 of the subject vehicle 1 decreases.

The processor 10 of the driving control device 100 may calculate the evaluation value such that the evaluation value corresponding to the second inter-vehicular distance shorter than the first inter-vehicular distance is higher than the evaluation value corresponding to the first inter-vehicular distance based on the inter-vehicular distance D between the subject vehicle 1 and the preceding vehicle 2. This allows the driving control device 100 to easily increase the driving assistance level from the first driving assistance level to the second driving assistance level because the shorter the inter-vehicular distance D between the subject vehicle 1 and the preceding vehicle 2 is, the more easily the subject vehicle 1 travels behind the preceding vehicle 2, and the lower the possibility that an obstacle is present between the subject vehicle 1 and the preceding vehicle 2 is.

The processor 10 of the driving control device 100 may calculate the evaluation value such that the evaluation value corresponding to the second inter-vehicular distance shorter than the first inter-vehicular distance is higher than the evaluation value corresponding to the first inter-vehicular distance based on the elapsed time after the detection of the preceding vehicle 2 ahead of the subject vehicle 1. This allows the driving control device 100 to easily increase the driving assistance level from the first driving assistance level to the second driving assistance level because the shorter the elapsed time after the detection of the preceding vehicle 2 is, the lower the possibility that an obstacle or the like is present ahead of the subject vehicle 1 is.

The processor 10 of the driving control device 100 may determine whether a traffic jam is present around the subject vehicle 1, and calculate the evaluation value such that the evaluation value when a traffic jam is present is higher than the evaluation value when any traffic jam is not present. This allows the driving control device 100 to easily increase the driving assistance level from the first driving assistance level to the second driving assistance level because it is easy to travel by following the preceding vehicle 2 behind the preceding vehicle 2 when a traffic jam is present around the subject vehicle 1 compared with the case where any traffic jam is not present.

The processor 10 of the driving control device 100 controls the driving of the subject vehicle 1 by the hands-off mode which permits the subject vehicle 1 to travel in the state where driver's hold on the steering wheel of the subject vehicle 1 is released when the driving of the subject vehicle 1 is controlled at the second driving assistance level. This allows the driving control device 100 to reduce a driving load on the driver because the driving of the subject vehicle 1 is controlled by the hands-off mode when the driving of the subject vehicle 1 is controlled in the second driving assistance level.

The processor 10 of the driving control device 100 controls the driving of the subject vehicle 1 by the eyes-off mode which permits the subject vehicle 1 to travel in the state where the driver does not visually confirm the front when the driving of the subject vehicle 1 is controlled at the second driving assistance level. This allows the driving control device 100 to reduce a driving load on the driver because the driving of the subject vehicle 1 is controlled by the eyes-off mode when the driving of the subject vehicle 1 is controlled at the second driving assistance level.

DESCRIPTION OF REFERENCE NUMERALS

1 Subject vehicle
2 Preceding vehicle
100 Driving control device
10 Processor
11 Evaluation value calculation unit
12 Transition request determination unit
13 Transition condition setting unit
15 Vehicle control unit

The invention claimed is:

1. A driving control method for controlling driving of a subject vehicle at a predetermined driving assistance level using a processor, the driving control method comprising:
   determining whether a transition request is input that requires transition of a driving assistance level from a first driving assistance level to a second driving assistance level higher than the first driving assistance level;
   when the transition request is input, relaxing a transition condition relating to a traveling environment of the subject vehicle for the transition of the driving assistance level from the first driving assistance level to the second driving assistance level, compared with when the transition request is not input; and
   controlling the driving of the subject vehicle such that the driving assistance level transitions from the first driving assistance level to the second driving assistance level when the traveling environment of the subject vehicle meets the transition condition,
   wherein the transition condition is set to be stricter than a transition possible condition, which is a condition for notifying an occupant of the subject vehicle that the driving assistance level can transition from the first driving assistance level to the second driving assistance level.

2. The driving control method according to claim 1, further comprising:
   calculating an evaluation value that indicates a sufficiency level of the transition condition;
   selecting a second evaluation threshold lower than a first evaluation threshold as an evaluation threshold when the transition request is input, the first evaluation threshold being an evaluation threshold when the transition request is not input; and
   controlling the driving of the subject vehicle such that driving assistance level transitions from the first driving assistance level to the second driving assistance level when the evaluation value is higher than the evaluation threshold, and when the subject vehicle is controlled at the first driving assistance level.

3. The driving control method according to claim 2, further comprising maintaining the evaluation threshold at the second evaluation threshold until a predetermined time elapses after the input of the transition request.

4. The driving control method according to claim 2, further comprising setting a transition time after the evaluation value becomes a value higher than the evaluation threshold until the driving assistance level transitions from the first driving assistance level to the second driving assistance level such that a second transition time when the transition request is input is shorter than a first transition time when the transition request is not input.

5. The driving control method according to claim 2, further comprising calculating the evaluation value such that the evaluation value corresponding to a second vehicle speed of the subject vehicle is higher than the evaluation value corresponding to a first vehicle speed of the subject vehicle, and the second vehicle speed is lower than the first vehicle speed.

6. The driving control method according to claim 2, further comprising calculating the evaluation value such that the evaluation value corresponding to a second inter-vehicular distance is higher than the evaluation value corresponding to a first inter-vehicular distance based on an inter-vehicular distance between the subject vehicle and a preceding vehicle traveling ahead of the subject vehicle, and the second inter-vehicular distance is shorter than the first inter-vehicular distance.

7. The driving control method according to claim 2, further comprising calculating the evaluation value such that the evaluation value corresponding to a second elapsed time is higher than the evaluation value corresponding to a first elapsed time based on an elapsed time after detection of a preceding vehicle when the preceding vehicle traveling ahead of the subject vehicle is detected, and the second elapsed time is shorter than the first elapsed time.

8. The driving control method according to claim 2, further comprising:
   determining whether a traffic jam is present around the subject vehicle; and
   calculating the evaluation value such that the evaluation value when a traffic jam is present is higher than the evaluation value when any traffic jam is not present.

9. The driving control method according to claim 1, further comprising, when the driving of the subject vehicle is controlled at the second driving assistance level, controlling the driving of the subject vehicle by a hands-off mode which permits the subject vehicle to travel in a state where driver's hold on a steering wheel of the subject vehicle is released.

10. The driving control method according to claim 1, further comprising, when the driving of the subject vehicle is controlled at the second driving assistance level, controlling the driving of the subject vehicle by an eyes-off mode which permits the subject vehicle to travel in a state where a driver does not visually monitor surrounding conditions of the subject vehicle.

11. A driving control device that controls autonomous driving of a subject vehicle at a predetermined driving assistance level using a processor, the driving control device comprising a processor configured to:
   determine whether a transition request is input that requires transition of a driving assistance level from a first driving assistance level to a second driving assistance level higher than the first driving assistance level;
   relax, when the transition request is input, a transition condition relating to a traveling environment of the subject vehicle for the transition of the driving assistance level from the first driving assistance level to the second driving assistance level, compared with when the transition request is not input; and
   control the driving of the subject vehicle such that the driving assistance level transitions from the first driving assistance level to the second driving assistance level when the traveling environment of the subject vehicle meets the transition condition,
   wherein the transition condition is set to be stricter than a transition possible condition, which is a condition for notifying an occupant of the subject vehicle that the driving assistance level can transition from the first driving assistance level to the second driving assistance level.

* * * * *